124,134

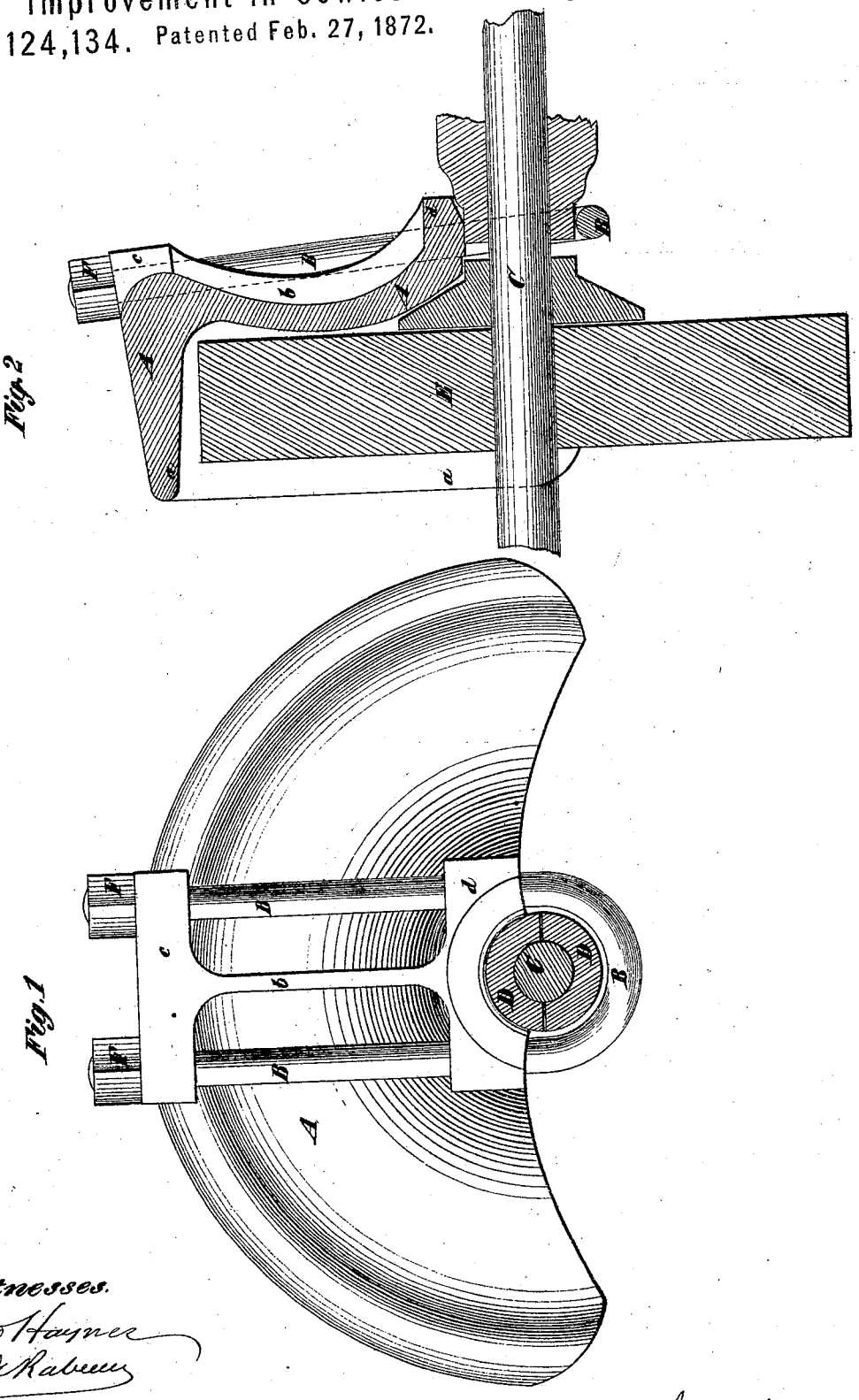

UNITED STATES PATENT OFFICE.

CHARLES HEATON, OF NEW YORK, N. Y., ASSIGNOR TO "THE TANITE COMPANY," OF STROUDSBURG, PENNSYLVANIA.

IMPROVEMENT IN COWLS FOR EMERY-WHEELS.

Specification forming part of Letters Patent No. 124,134, dated February 27, 1872.

*To all whom it may concern:*

Be it known that I, CHARLES HEATON, of the city, county, and State of New York, have invented a new and Improved Cowl for Emery-Wheels; and I do hereby declare that the following is a full, clear, and exact description thereof, reference being had to the accompanying drawing forming a part of this specification.

This invention consists in a cowl of novel construction for emery-wheels and other grinding-wheels, and in a novel mode of attaching the cowl to the grinding-machine, whereby in case of the breakage of the wheel the workman is effectually protected from the broken pieces, and convenient provision is made for the quick and secure adjustment of the cowl to any desirable position.

In the accompanying drawing, Figure 1 is a side or face view of the cowl, showing it applied to a wheel; and Fig. 2 is a central transverse section of the same.

Similar letters of reference indicate corresponding parts in both figures.

A is the cowl, consisting of a semicircular plate, provided with a rim, $a$, which, when the cowl is in place, projects over the periphery of the grinding-wheel. It may be and is represented as a single casting, and should, preferably, be of malleable iron. On the middle of its exterior is a radial rib-like projection, $b$, at the ends of which are perpendicular block-like projections $c$ and $d$, in each of which there are two parallel holes for the reception of the arms of a staple-like screw-clamp, B. The lower of these block-like projections is recessed to fit a circular concentric projection, D, on one of the journal-boxes of the shaft C of the wheel. The screw-clamp B is of U-form, like an ordinary staple, and is screw-threaded at both ends. Its rounded or bowed portion fits the projection D of the journal-box, and its arms pass through the holes in the aforesaid block-like projections, and have nuts F F screwed on their screw-threaded ends to secure the staple in place.

The screw-clamp may be adjusted by the nuts to secure the cowl to journal-boxes of different diameters, and when thus screwed up tight it is prevented from turning by adjustable braces. Before the nuts are screwed up, or when they are unscrewed, the cowl may be turned around the stone to bring it to any position necessary or desirable for the protection of the workman. The cowl may be secured in the same way to any other stationary portion of the machine. It may also be attached in the same way, but loosely, to the shaft or any other rotating portion of the machine, but in such case will be provided with an adjustable brace to keep it in place.

The cowl, being open on one side, leaves one entire side of the wheel uncovered, so that grinding can be performed on one side of the wheel, yet by being adjusted to the required position its rim affords efficient protection to the workman.

What I claim as my invention, and desire to secure by Letters Patent, is—

1. An adjustable cowl or partial cover for emery or other grinders, attached to the machine by means of a screw-clamp which permits it to be turned to various positions, substantially as and for the purpose herein described.

2. The combination, substantially as herein described, with the cowl, of a staple-like screw-clamp, B, and nuts F F, operating as and for the purpose herein set forth.

CHAS. HEATON.

Witnesses:
 FRED. HAYNES,
 R. E. RABEAU.